United States Patent
Mountcastle et al.

(10) Patent No.: US 9,261,593 B1
(45) Date of Patent: Feb. 16, 2016

(54) HIGHER ORDER PROCESSING FOR SYNTHETIC APERTURE RADAR (SAR)

(71) Applicant: Lockheed Martin Corporation, Bethesda, MD (US)

(72) Inventors: Paul D. Mountcastle, Moorestown, NJ (US); Svetlana M. Bachmann, Liverpool, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 381 days.

(21) Appl. No.: 13/799,837

(22) Filed: Mar. 13, 2013

(51) Int. Cl.
*G01S 7/292* (2006.01)
*G01S 7/41* (2006.01)
*G01S 13/56* (2006.01)
*G01S 13/90* (2006.01)

(52) U.S. Cl.
CPC .............. *G01S 13/90* (2013.01); *G01S 7/292* (2013.01); *G01S 7/41* (2013.01); *G01S 7/411* (2013.01); *G01S 7/412* (2013.01); *G01S 7/415* (2013.01); *G01S 13/56* (2013.01); *G01S 13/9035* (2013.01)

(58) Field of Classification Search
CPC ........... G01S 7/292; G01S 7/41–7/418; G01S 13/56; G01S 13/90–13/9094
USPC ....... 342/25 R, 25 A, 25 B, 25 C, 25 D, 25 E, 342/25 F, 89, 90, 160–162, 175, 189
See application file for complete search history.

(56) References Cited

U.S. PATENT DOCUMENTS

| | | | | |
|---|---|---|---|---|
| 3,975,734 A * | 8/1976 | Payne | ...................... | 342/25 B |
| 4,132,990 A * | 1/1979 | Di Domizio et al. | ........... | 342/89 |
| 4,963,877 A * | 10/1990 | Wood et al. | ................ | 342/25 A |
| 5,122,803 A * | 6/1992 | Stann et al. | ................ | 342/25 B |
| 5,818,383 A * | 10/1998 | Stockburger et al. | ......... | 342/109 |
| 5,959,566 A * | 9/1999 | Petty | ......................... | 342/25 B |
| 6,400,306 B1 * | 6/2002 | Nohara et al. | ............. | 342/25 R |
| 6,691,947 B2 * | 2/2004 | La Fata | ...................... | 244/3.19 |
| 6,911,933 B1 * | 6/2005 | Mutz et al. | ................ | 342/25 B |
| 6,943,724 B1 * | 9/2005 | Brace et al. | ............... | 342/25 B |
| 6,952,178 B2 * | 10/2005 | Kirscht | ..................... | 342/25 B |
| 7,456,780 B1 * | 11/2008 | Garren | ...................... | 342/25 A |
| 7,741,990 B2 * | 6/2010 | Aprile | ....................... | 342/25 B |

(Continued)

OTHER PUBLICATIONS

Raney, R.K., "Synthetic Aperture Imaging Radar and Moving Targets." Journal, (1971), pp. 499-505, vol. AES-7, No. 3 Aerospace and Electronic Systems, IEEE Transactions on.

(Continued)

*Primary Examiner* — Peter Bythrow
(74) *Attorney, Agent, or Firm* — Howard IP Law Group, PC

(57) ABSTRACT

A method for processing received return signals in a visual synthetic aperture radar (ViSAR) system is provided. The method includes receiving a plurality of pulsed radar return signals over a time period corresponding to a plurality of data frames. From this data, processing is performed to generate a SAR image for each single data frame of the plurality of data frames. In parallel, the radar pulses used to form the image frames are buffered into a longer pulse sequence that is used to perform the detection processing, including identifying targets as having characteristics associated with one or more predetermined motion classes according to phase changes sensed between data frames. A visual indication of targets associated with a predetermined motion class is generated, and overlaid onto one of the SAR images.

13 Claims, 5 Drawing Sheets

(56) References Cited

U.S. PATENT DOCUMENTS

| | | | | |
|---|---|---|---|---|
| 7,898,457 | B2* | 3/2011 | Jahangir | 342/25 A |
| 8,803,732 | B2* | 8/2014 | Antonik et al. | 342/160 |
| 9,019,143 | B2* | 4/2015 | Obermeyer | 342/25 R |
| 2009/0102705 | A1* | 4/2009 | Obermeyer | 342/25 F |
| 2011/0298654 | A1* | 12/2011 | Hellsten | 342/25 A |

OTHER PUBLICATIONS

Cumming, Ian G.; Wong, Frank. H., "Digital processing of synthetic aperture radar data: Algorithms and implementation." Book, (2005), pp. 226-229, Boston: Artech House.

Sharma, J.J.; Gierull, C. H.; Collins, M.J., "Compensating the effects of target acceleration in dual-channel SAR-GMTI." Journal, (2006), vol. 153, No. 1, pp. 53-62, Radar, Sonar and Navigation, IEE Proceedings.

Rüegg, Maurice, "Ground moving target indication with millimeter wave synthetic aperture radar" Ph.D thesis, (2007), vol. 48, Remote Sensing Series, University of Zürich.

Bin Deng; Yuliang Qin; Yanpeng Li; Hongqiang Wang; Xiang Li, "A Novel Approach to Range Doppler SAR Processing Based on Legendre Orthogonal Polynomials." Journal, (2009), pp. 13-17, vol. 6, No. 1, Geoscience and Remote Sensing Letters, IEEE.

Fogle, Orelle R. E., "Human micro-range/micro-Doppler signature extraction, association, and statistical characterization for high resolution radar." Ph.D. dissertation, (2011), Wright State University.

Majumder, Uttam K., "Toward development of a wide-area, all-weather, all-hour persistent surveillance system using circular synthetic aperture radar: key technical challenges and innovative approaches." Report, (2011), Purdue University.

Bin Deng; Yuliang Qin; Yanpeng Li; Hongqiang Wang; Xiang Li, "An efficient mathematical description of range models for high-order-motion targets in synthetic aperture radar." Journal, (2012), pp. 0006-0010, Radar Conference (Radar), 2012 IEEE.

Wallace, Bruce H., "Video Synthetic Aperture Radar (ViSAR)." Powerpoint, (2012), DARPA.

Hersey, R.K.; Melvin, W.L.; Culpepper, E., "Dismount modeling and detection from small aperture moving radar platforms," Radar Conference, 2008. Radar '08. IEEE , pp. 1,6, May 26-30, 2008.

* cited by examiner

HIGHER ORDER PROCESSING FOR SYNTHETIC APERTURE RADAR (SAR)

FIELD OF THE INVENTION

The present invention relates to signal processing systems and methods used in radar systems, and more particularly, to systems and methods for improving the performance of synthetic aperture radar (SAR) systems.

BACKGROUND

Remote sensing systems, such as radar systems used to detect the presence, position, speed and/or other characteristics of objects, are vital to both civilian and military operations. These systems utilize electromagnetic (EM) waves to detect, track and classify, for example, precipitation and natural/man-made objects. In operation, these systems typically transmit "beams" or signals toward targets, and process reflected return signals (or echoes) for target identification and characterization. Modern radar systems include phased array radar systems which utilize a plurality of selectively-controlled, parallel-processed, antenna elements making up an antenna. Referring generally to FIG. 1, SAR systems have also been developed which may utilize, for example, a single transmitting antenna element mounted to a moving platform, such as an aircraft 6. The antenna element may be used to form a single beam 8 which is transmitted in pulses, repeatedly illuminating a portion or segment of a target area 9, and receive reflected signals including amplitude and phase data corresponding to illuminated segment of the target area. As the aircraft travels relative to the target area, reflected signals from subsequent segments of the target area are obtained over a given period of time. Using this data, image processing algorithms may generate or reconstruct high-resolution images of the entire target area, electronically simulating an image which could only be obtained by a larger antenna (i.e. an antenna having a length equal to the velocity of the aircraft multiplied by the time period). As illustrated, the flight path 12 of aircraft 6 may be an oval or circular path.

Images generated by SAR systems are often used for detection and tracking of objects that may otherwise be difficult to achieve using known photographic devices that generate imagery using visible or infrared light, especially in adverse atmospheric conditions, such as cloud cover. As currently implemented, however, these SAR systems are prone to distortion in the case of moving targets, as well as an inability to discriminate slow moving objects, such humans walking within a target area. This distortion further inhibits the systems' ability to characterize the type of target detected, as well as predict future movements.

Accordingly, improved systems and methods for providing long-range target tracking, including moving target tracking, as well as improved target characterization in all environmental conditions are desired.

SUMMARY

According to one embodiment of the present disclosure, a method for processing received return signals in a visual synthetic aperture radar (ViSAR) system is provided. The method includes receiving a plurality of pulsed radar return signals over a time period corresponding to a plurality of data frames. As referred to herein, a frame of SAR data generally refers to an image of a portion of the ground formed from multiple wideband pulses. The number of cells in the Doppler (radial velocity) direction is determined by the number of pulses used to construct the image. The number of cells of the image in the range direction is determined by the bandwidth of each of the pulses. From this data, processing is performed to generate a SAR image for each single data frame of the plurality of data frames. In parallel, the radar pulses used to form the image frames are buffered into a longer pulse sequence that is used to perform the detection processing, including identifying targets as having characteristics associated with one or more predetermined motion classes according to phase changes sensed between data frames. A visual indication of targets associated with a predetermined motion class is generated, and overlaid onto one of the SAR images.

A system for processing received return signals in a SAR system is also provided. The system generally comprises a transmitter for transmitting a plurality of pulsed radar signals, a receiver for receiving reflected return signals from the plurality of pulsed radar return signals over a time period corresponding to a plurality of data frames, and at least one processor. The processor is configured to generate a SAR image for each of the single data frames, and process a plurality of the single data frames. This processing may include identifying targets as having characteristics associated with one or more predetermined motion classes according to phase changes sensed between data frames.

DETAILED DESCRIPTION

Figure 1:
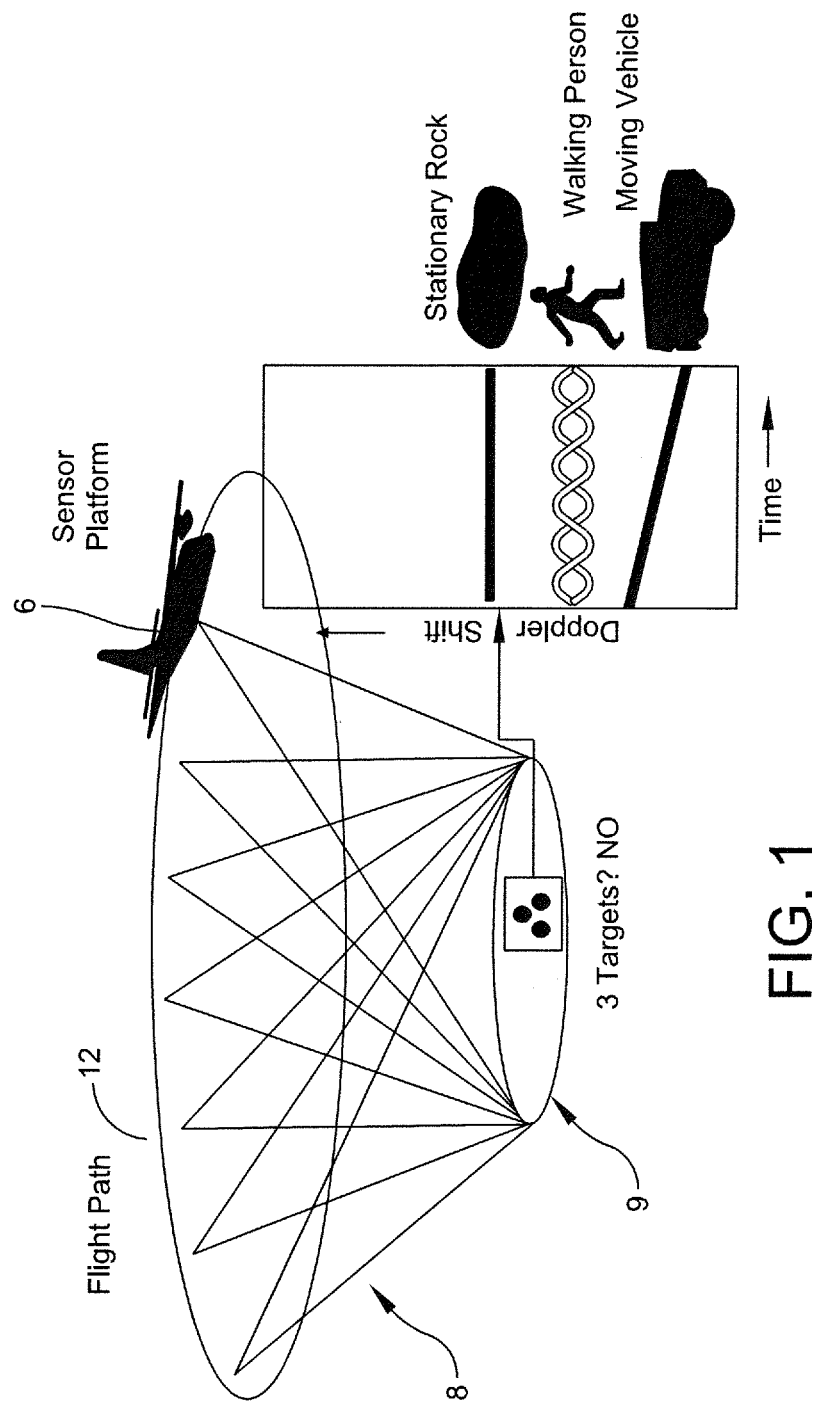
FIG. 1 is an illustration of the function of a SAR system used in embodiments of the present invention.

It is to be understood that the figures and descriptions of the present invention have been simplified to illustrate elements that are relevant for a clear understanding of the present invention, while eliminating, for purposes of clarity, many other elements found in typical remote sensing systems, including radar systems such as SAR systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

As set forth above, the ability to track and characterize ground-based targets of interest in all environmental conditions has become increasingly important. SAR systems, such as visual synthetic aperture radar (ViSAR), may be employed for such uses. ViSAR's operating principle is to generate a video-like sequence of high resolution SAR images. Targets of high interest, including vehicles and individuals, are intended to be tracked frame-to-frame in much the same way as targets are tracked in the clear using electro-optical/IR sensors.

in order to effectively track and characterize a variety of target types, including accelerating targets, proposed ViSAR system requirements include at least 0.2 meter resolution over a 100 meter Field of Regard (FOR). Moreover, being able to accurately discriminate and characterize moving targets includes being able to detect accelerations of approximately 1G at this resolution, requiring an effective frame rate of approximately 5 Hz. Accordingly, a proposed ViSAR system operating under these criteria would enable imaging through clouds, while providing the benefits of moving object detection, including targets with a small radar cross section (RCS), as well as with slow velocity and/or acceleration rates.

Previously, range-Doppler algorithms (RDAs) have been used as SAR image format techniques. These algorithms only consider low-order polynomials representing relatively simple linear phase models for representing scatterers in motion. The parametric phase model used by existing SAR systems is of the form $$\phi(f, t \mid r, v) = \frac{4\pi f}{c}(r + vt) \qquad \text{Eq. 1}$$

wherein f is the frequency of the signal, r is the range of the scatterer, v is the velocity of the scatterer, t is time, and c is the velocity of propagation. However, targets experience accelerations, as well as other types of nonlinear motion, which cannot be represented by these low-order polynomial phase models. Accordingly, if a given scatterer is accelerating or otherwise moving outside of the parameters of these models, the images generated by these models may become distorted.

In order to further improve SAR performance, new processing algorithms are required for discriminating between various target types, as well as accurately characterizing moving and accelerating objects. According to an embodiment of the present disclosure, the video detection and tracking capability provided by ViSAR may be augmented with improved moving target classification techniques. In one aspect, this is achieved by additional processing of the measured coherent SAR data through a parallel path that utilizes a longer coherent integration time, for example, on the order of 1 second or more, versus approximately 0.2 seconds as currently implemented by SARs systems. These embodiments enable ground target classification based on fine target motion characteristics. More specifically, using this longer time scale, distinctions between classes of moving targets that are not evident in the 0.2 second ViSAR frame time are captured in the coherent radar data stream simultaneously with the generation of video SAR from the same data. Improved phase models, including phase models which include higher order terms, may be used to extract new dimensions of information (e.g. acceleration) from the SAR data stream by means of this extended coherent integration.

Figure 2:
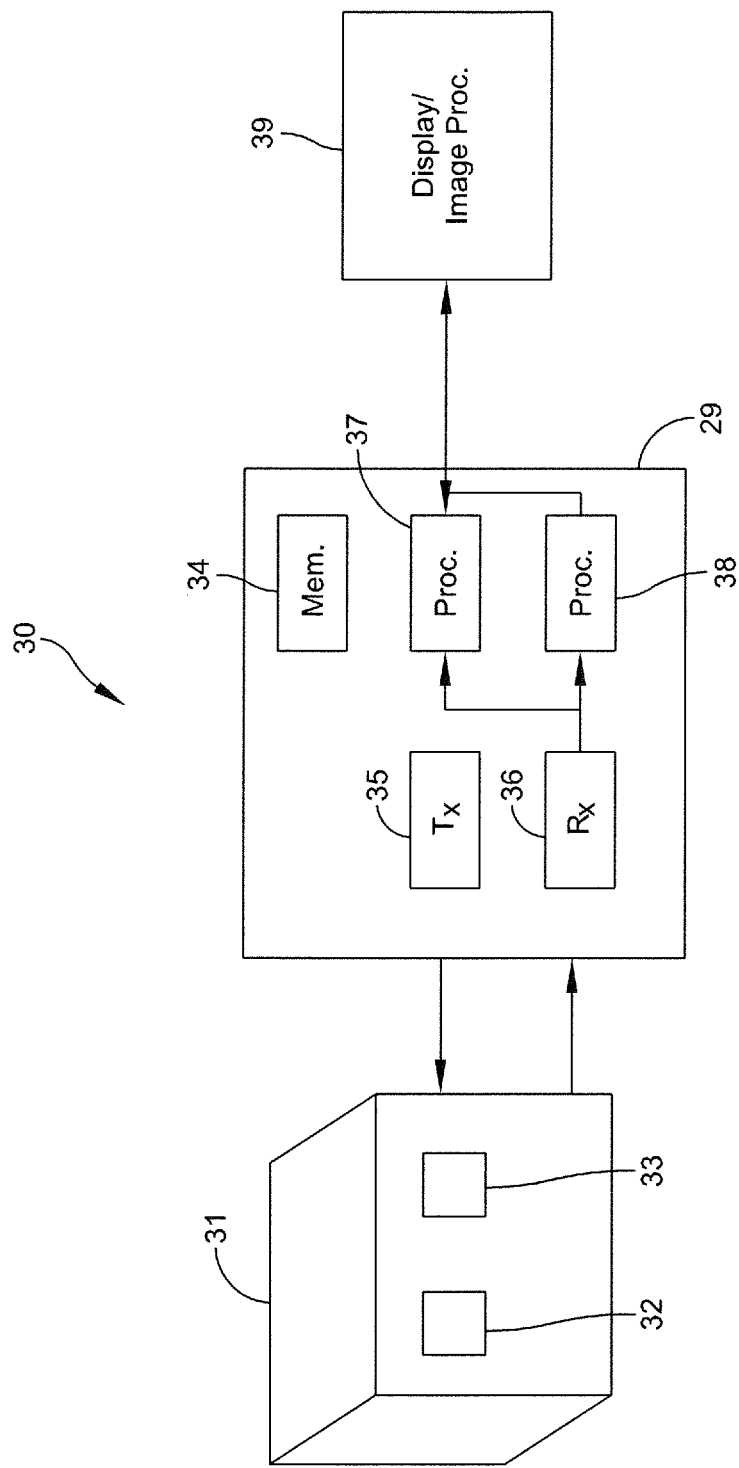
FIG. 2 is a simplified block diagram of a SAR system useful for describing embodiments of the present disclosure.

FIG. 2 illustrates an exemplary ViSAR system 30 for implementing the above-described method, including an antenna 31 having at least one transmitting antenna element 32 and at least one receiving antenna element 33. A control module 29 may include, for example, a transmitter 35 and a receiver 36 for interfacing with antenna element 32, as well as one or more processors 37,38 and a memory device 34. While not illustrated for the purposes of brevity, it should be understood that system 30 may also include other components and related hardware associated with a SAR system. For example, return signals from each transmitted pulse are subsequently captured and provided to receiver 36 or front-end module for signal modulation. This receiver may include, by way of example only, processing components, including one or more filters, a low-noise amplifier and a down converter, as will be understood by one of ordinary skill in the art. At least one A/D converter may be provided for converting received analog return signals to digital form comprising I/O in-phase and quadrature-phase (I/O) signal components from which magnitude and phase data may be extracted according to known methods.

In the illustrated embodiment, control module 29 comprises processors 37 and 38 responsive to one or more memory devices 34 for performing the parallel processing operations set forth in detail herein. More specifically, in the exemplary embodiment, processor 37 may be configured to perform traditional ViSAR processing methods including generating SAR images on a frame-by-frame basis, as well as outputting video-like image stream. Processor 38 may be provided for performing higher-order processing operations in parallel with this traditional ViSAR image processing. The results of these processing operations may be combined (e.g. overlaid), and a video-like output provided to a user via one or more displays 39.

Figure 3:
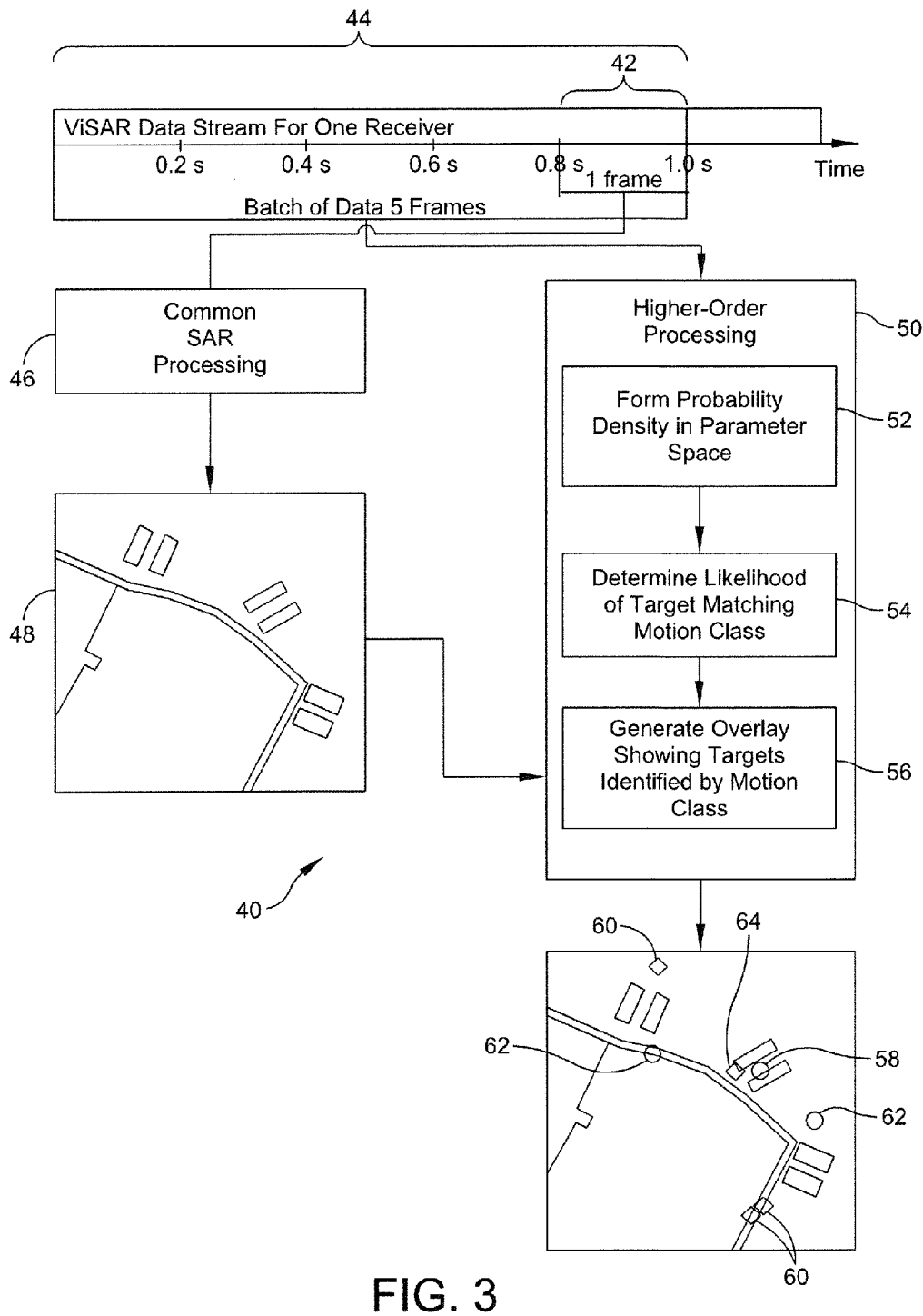
FIG. 3 is a process-flow diagram illustrating a parallel processing method according to an embodiment of the present disclosure.

Referring generally to FIG. 3, the general operation of a system and method according to an embodiment of the present disclosure is shown. A process 40 for providing improved target classification and tracking includes utilizing a traditional ViSAR processing arrangement 46 which is responsive to return data received over a given time increment 42 (e.g. 0.2 seconds). Each 0.2 second increment may correspond to a single frame of data, and from each data frame a background image 48 may be generated. As described above, a plurality of these background images maybe used to generate video-like output data to a user. Standard image processing such as video processing may be used to track and locate targets on the video independently of the techniques described in the invention.

Figure 4:
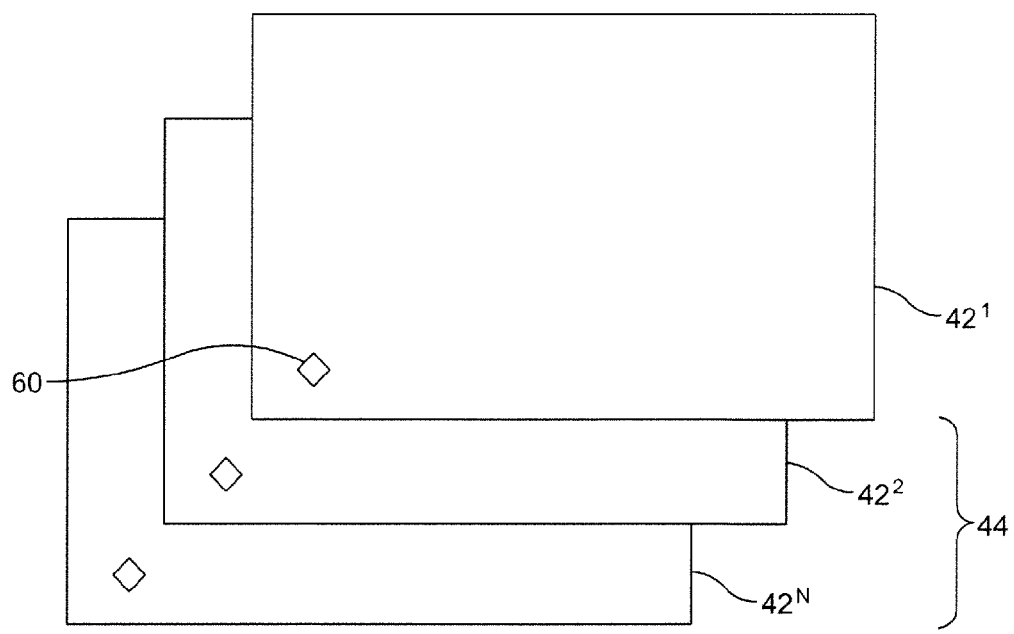
FIG. 4 is an illustration of an aspect of the processing method according to an embodiment of the present disclosure.

Process 40 further includes a higher order, parallel processing method 50. In one embodiment, processing method 50 utilizes data taken from a group 44 of successive frames 42 (e.g. 5 sequential frames of received data) obtained over a longer time scale (e.g. 1 second) to identify target characteristics which do not appear in individual data frames. See also FIG. 4, wherein frames $42^1$-$42^N$ are analyzed concurrently, or integrated, such that motion characteristics of a given target 60 may be revealed. In one embodiment, processing method 50 may include the steps of forming a probability density in a multidimensional space whose dimensions are the parameters of the phase model (block 52). This probability density is determined, for example, according to the processing and calculations associated with that of eq. 3 as described herein. In block 54, a determination is made as to the likelihood that a given target matches a particular motion class by convolving the calculated probability density with a class conditional probability density per individual class over the parameters of the phase model. These class conditional probability density functions are pre-determined statistically. Once a target has been associated with a motion class, block 56 includes generating a visual indication (58,62,64) of a target class for each identified target, and overlaying this indication onto the SAR images 48 obtained from the traditional processing 46. In this way, the output of the process may include a video-like data stream which not only identifies targets, but also identifies targets according to motion type.

As described above, from received phase data it is possible to formulate a parametric representation of target or scatterer phase in terms of generalized coordinates that include higher order terms. The features in the parametric representation can be trained for motion discrimination. In this way, a plurality of target classes may be predefined, and stored into memory (e.g. memory device 34, FIG. 2) based on unique phase data characteristics. As phase features are distinct for different target classes, it is possible to separately discriminate between different classes (stationary objects, linearly moving targets and humans, etc.).

Figure 5:
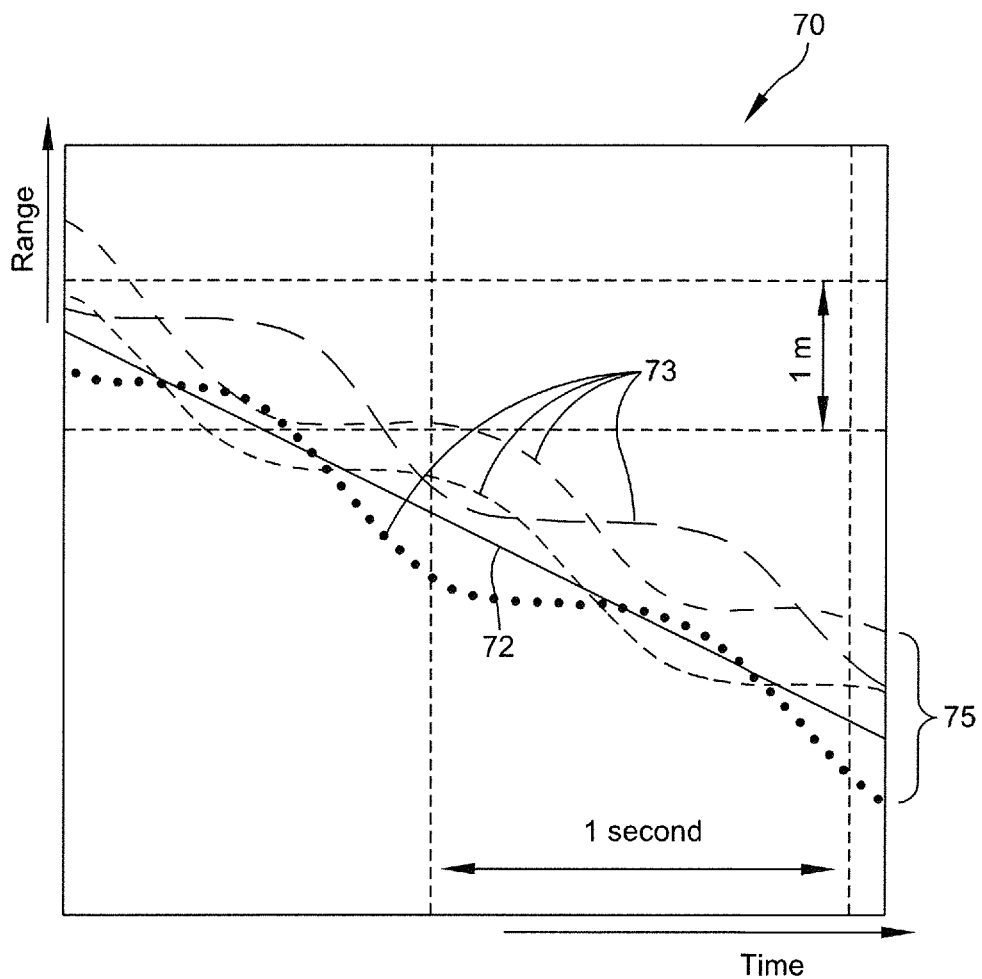
FIG. 5 is a graphical representation of radar return signals corresponding to portions of a moving human target.

Likewise, higher order phase models may be provided which classify target motion based on other nonlinear motion types. More specifically, the phase histories between, for example, a ground vehicle, a stationary ground target, or a windblown tree limb, will display unique phase patterns. Referring generally to FIG. 5, the phase history of a walking human may reflect the minor variations in the distance from the receiving antenna to the human, including each of their limbs. As illustrated, limbs 73 of a human target exhibit sinusoidal oscillations as they engage in walking or running, while the torso demonstrates a steady velocity in a given direction. This distinct, highly characteristic pattern 75 may be utilized as the basis of a model representing one or more classes of human motions:

$$\phi(f, t \mid r, v, A, \omega, \varphi) = \frac{4\pi f}{c}(r + vt + A\cos(\omega t + \varphi)) \quad \text{Eq. 2}$$

Eq. 2 describes the process of forming an image in the multidimensional space of coordinates (r,v,A,ω,Φ) that describe target motion. A single real power value is assigned to each point in the multidimensional space. This value may be interpreted as the probability that the target has the motion properties indicated.

$$I(r, v, A, \omega, \varphi) = \left| \sum_f \sum_t Z(f, t) e^{-i\phi(f,t\mid r,v,A,\omega,\varphi)} \right|^2 \quad \text{Eq. 3}$$

Image formed from measured radar data Z(f,t) may be interpreted as the probability that the target represented by the radar data exhibited motion parameters (r,v,A,w,f).

The class conditional probability p(r,v,A,ω,Φ|C) that a target of class C will exhibit the motion parameters or coordinates (r,v,A,ω,Φ) may be obtained statistically. The likelihood or probability that the target belongs to class C is determined by convolution (pointwise multiplication and sum) of the probability given by Eq. 3 with the pre-determined class conditional probability p(r,v,A,ω,Φ|C). That is, as shown below, the probability that the target belongs to class C is the convolution of the image with the class conditional probability density that is pre-determined statistically. The denominator represents a sum over all classes C' and is a normalization factor that insures that the probabilities of individual classes add up to 1.

$$P(C) = \frac{\int p(r, v, A, \omega, \varphi \mid C) I(r, v, A, \omega, \varphi)}{\sum_{C'} \int p(r, v, A, \omega, \varphi \mid C') I(r, v, A, \omega, \varphi)} \quad \text{Eq. 4}$$

The advantages of this higher order phase processing include mitigating SAR artifacts from moving targets (smearing, layover, displacement), uniquely identifying scatterer intrinsic features and behavior, and exposing features that enable discrimination of targets by classes. Further, embodiments of the present disclosure provide the ability to perform simultaneous detection-level micro-motion based classification of moving targets. Improvements in predicted target paths with the above-described high order terms may also enable more accurate weapons targeting.

The embodiments are provided by way of example only, and other embodiments for implementing the methods described herein may be contemplated by one of skill in the pertinent art without departing from the intended scope of this disclosure. For example, systems, including the SAR system processing described herein, may include memory containing data, which may include instructions, the instructions when executed by a processor or multiple processors, cause the steps of a method for performing the signal processing and weight creation set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for processing received return signals in a synthetic aperture radar (SAR) system, including:
   receiving, with a receiver of the SAR system, a plurality of pulsed radar return signals over a time period corresponding to a plurality of data frames;
   with at least one processor of the SAR system:
      processing the received return signals to generate a SAR image for each of the single data frames;
      processing a plurality of the single data frames, the processing including identifying targets as having characteristics associated with one or more predetermined motion classes according to phase changes sensed between data frames; and
      generating, with a display coupled to the at least one processor, a visual indication of targets associated with a predetermined motion class, and
      overlaying the visual indication of targets associated with a predetermined motion class onto one of the SAR images,
      wherein each of the one or more motion classes is predefined by a respective one or more parametric models, each model representing a discrete type of motion stored in a memory device.

2. The method of claim 1, wherein the plurality of data frames comprise range-velocity data.

3. The method of claim 1, wherein the step of identifying targets having characteristics associated with one or more predetermined motion classes includes determining acceleration characteristics for each of the identified targets based on the plurality of data frames.

4. The method of claim 1, further comprising the step of displaying the SAR image with the overlaid visual indication of targets associated with a predetermined motion class to a user.

5. A system for processing received return signals in a synthetic aperture radar (SAR) system, including:
   a transmitter for transmitting a plurality of pulsed radar signals;
   a receiver for receiving reflected return signals from the plurality of pulsed radar return signals over a time period corresponding to a plurality of data frames;
   at least one processor configured to:
      generate a SAR image for each of the single data frames;
      process a plurality of the single data frames, the processing including identifying targets as having characteristics associated with one or more predetermined motion classes according to phase changes sensed between data frames, and
   a memory device,
      wherein each of the one or more motion classes is predefined by a respective one or more parametric models, each model representing a discrete type of motion stored in the memory device.

6. The system of claim 5, wherein the processor is further configured to:
   generate a visual indication of targets associated with a predetermined motion class, and
   overlay the visual indication of targets associated with a predetermined motion class onto one of the SAR images.

7. The system of claim 6, further comprising a display coupled to the processor, wherein the processor is further configured to display one of the SAR images and the visual indications of targets associated with a predetermined motion class to a user.

8. The system of claim 5, wherein the plurality of data frames comprise range-velocity data.

9. The system of claim 5, wherein the processor is further configured to determine acceleration characteristics for each of the identified targets based on the plurality of data frames.

10. The method of claim 1, wherein the step of identifying targets having characteristics associated with one or more predetermined motion classes includes determining the probability that an identified target matches one or more of the predetermined motion classes.

11. The method of claim 10, wherein the step of determining the probability that an identified target matches one or more of the predetermined motion classes includes the step of convolving a calculated conditional probability function with a predetermined class conditional probability function.

12. The system of claim 5, wherein identifying targets having characteristics associated with one or more predetermined motion classes includes determining the probability that an identified target matches one or more of the predetermined motion classes.

13. The system of claim 12, wherein determining the probability that an identified target matches one or more of the predetermined motion classes includes convolving a calculated conditional probability function with a predetermined class conditional probability function.

* * * * *